Sept. 21, 1954 M. P. REHORN 2,689,879

COLOR TELEVISION

Filed March 26, 1951 2 Sheets-Sheet 1

INVENTOR
MILES P. REHORN
BY John F. Ruele.
ATTORNEY

INVENTOR
MILES P. REHORN
BY John F. Rule,
ATTORNEY

Patented Sept. 21, 1954 2,689,879

UNITED STATES PATENT OFFICE 2,689,879

COLOR TELEVISION

Miles P. Rehorn, Nashville, Tenn.

Application March 26, 1951, Serial No. 217,554

16 Claims. (Cl. 178—5.4)

My invention relates to television, particularly to color television and in one modification to stereoscopic color television. Specifically the invention pertains to color belts which may be used either at the transmitter or receiver in a color television system or in a stereoscopic color television system.

An object of the invention is to provide a moving color belt which may be vertically and feasibly disposed before a non-retentive television receiving tube of any size or shape instead of a color disk which is only feasible with picture tubes up to 12½ inches in width.

Another object of the invention is to provide a moving belt for dissecting transmitted color images which may be disposed before a receiving tube, either the retentive or non-retentive type, of any size or shape which displaces the color disk which has the above-mentioned limitation.

Another object of the invention is to provide such a color belt which comprises birefringent filters and polarizing filters instead of color filters, providing more natural colors and greater purity of color.

Still another object of the invention is to provide a color belt which may, in addition to color segments, possess a series of polarizing filters, having their polarizing axes alternating relative to direction which may be used in not only dissecting color images but stereoscopic color images as well.

Another is to provide a color converter for the present recognized color television system which may be readily adapted to large diameter tubes.

Referring to the accompanying drawings.

Figure 2:
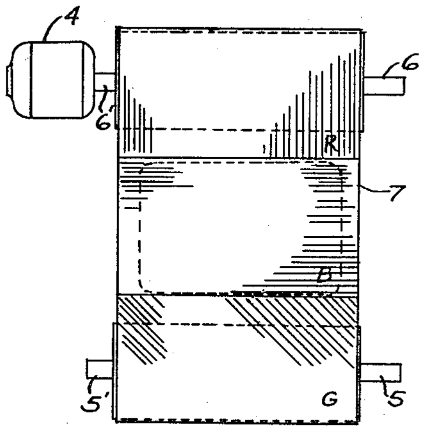
Fig. 2 is a front view of the same belt, and also showing a motor for rotating the drums or spools which actuate the color belt.

Fig. 2–A is a view of a motor and pulley assembly which may be used instead of direct attachment of the motor to the color drum or spool.

Figure 3:
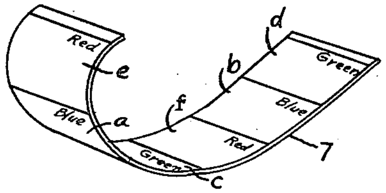

Fig. 3 is a detailed schematic view of the color belt itself.

Figure 4:
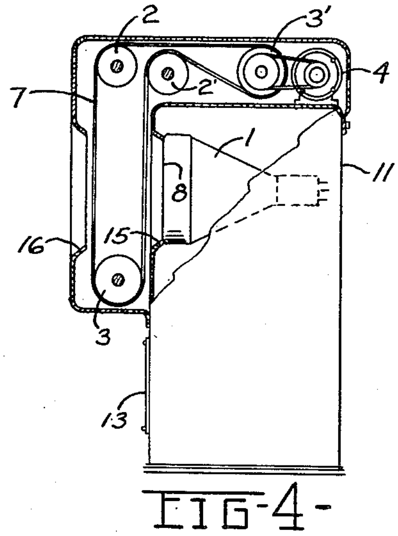
Figure 2A:
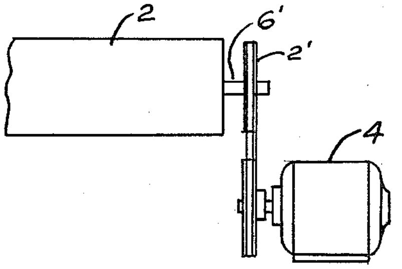

Fig. 4 shows a method for disposing the belt relative to the receiver in order to leave unhampered space for the operating dials of the television set.

Figure 5:
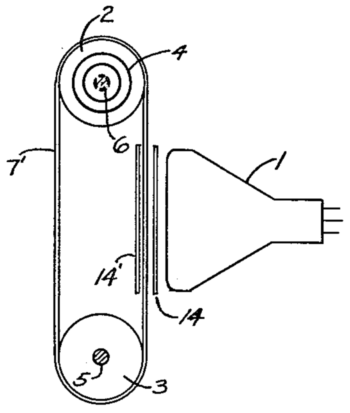
Figure 5A:
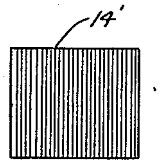
Figure 5B:
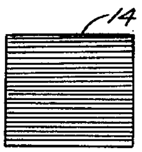

Fig. 5 is a schematic view of a belt which comprises birefringent filters (instead of color filters) and a pair of polarizing filters which are in cooperative relation with the belt, and means for rotating the belt before the face of either a non-retentive or retentive type television tube.

Figs. 5–A and 5–B are detail views of the stationary polarizing filters which are used in the form of apparatus shown in Fig. 5.

Figure 6:
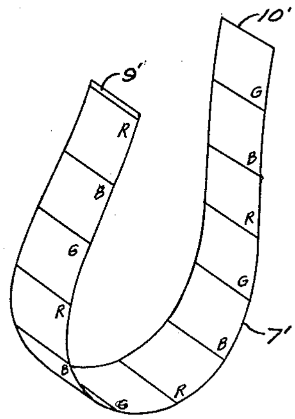

Fig. 6 is a schematic view showing details of a moving color belt which may be disposed before either a retentive or non-retentive television receiving tube.

Figure 7:
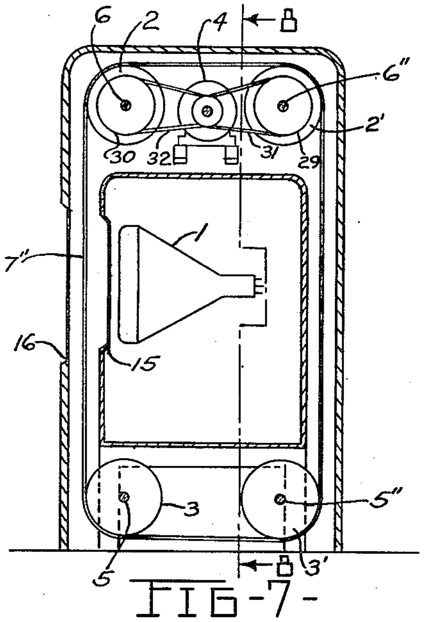
Figure 8:
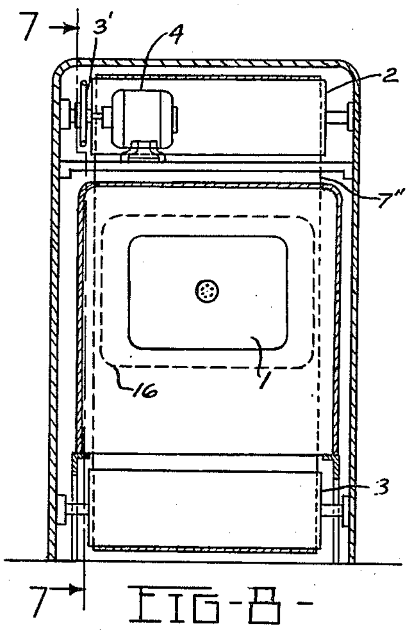

Fig. 7 is a sectional view at the line 7—7 on Fig. 8, showing the position of the belt of Fig. 6, and means for actuating it before the tube face.

Fig. 8 is a sectional rear view at the line 8—8 on Fig. 7.

Figure 9:
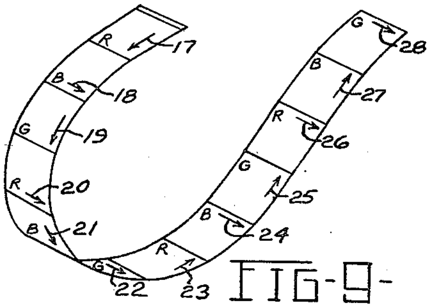

Fig. 9 is a schematic view of a color belt similar to that of Fig. 6 and which comprises a series of polarizing filters in addition to the color filters.

A serious disadvantage of any system of color television which uses a color disk at the receiver for receiving the transmitted color images is that such disks cannot be used with a direct view receiving tube of any size without either adding unsightly bulk to the cabinet when contained within said cabinet or presenting a clumsy or awkward looking device when used in the form of a converter on the outside of the cabinet of a conventional television set.

When a color belt, such as defined in certain aspects of my invention, is used with proper means for actuating it, the above disadvantages are removed since such a belt and actuating means may all be housed within a cabinet or converter cabinet which will be acceptable as an article of furniture in the house.

Figure 1:
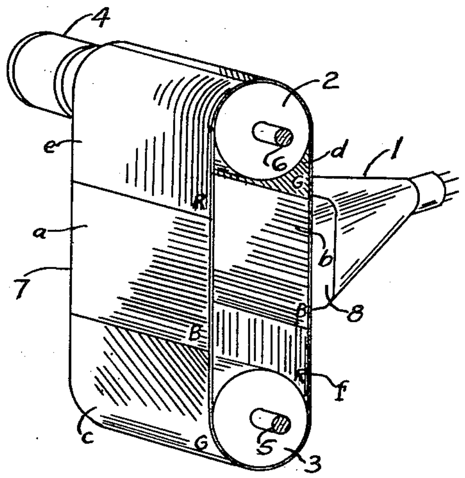
Fig. 1 is a schematic view of a color belt such as used in one form of the invention, and means for moving it before the image face of a non-retentive television tube.

Referring to Fig. 1, 1 is a television receiving tube of the non-retentive or non-storage type. 2 and 3 are pulleys around which the belt passes. 4 is a motor for driving the pulleys, 5 and 6 are the center axles of the pulleys. 7 is the color belt having six segments in rotation and in the order of red-blue-green, red-blue-green. 8 is the face of the receiving tube. *a*, *b*, *c*, *d*, *e* and *f* are color segments.

Fig. 2 is a front view of the device of Fig. 1.

Fig. 3 shows the arrangement of the color filters on the belt 7. The ends of the belt are spliced and cemented together with a suitable cement so that the belt will fit snugly around the drums or pulleys 2 and 3, Fig. 1. The color filters may be colored areas of a single belt of plastic or they may be separate color segments cemented to the plastic belt as a base.

The operation of the device will be obvious to those familiar with color television transmission and reception. Assuming that the field frequency of the transmitted color images is 144 per second, as each color image is scanned on the face 8 of the tube 1, the two color filters of the belt corresponding to that particular image will be before the tube face and between the observer and the said image, thus giving the proper color to that particular image. For example, when the image is transmitted which corresponds to the blue in the scene, both of the blue filters will be before the image as shown. During the blanking period before the next image which corresponds to the green in the picture is scanned, the green filter *c* shown at the bottom of the belt moves up to the position of the blue filter *a*, and the green filter *d* at the top of the belt moves down to the position of the blue filter *b*. Thus the green filters are now in front of the tube face, and the image corresponding to the green in the scene is scanned.

Next the red filter *f*, after having moved under the bottom of the drum 3, moves into position *a* before the tube face, and the red filter *d* after having moved over the top of the pulley 2 moves down to the position *b* before the tube face, and the image corresponding to the green in the image is scanned. Thus the cycle is repeated blue, green, red. Alternate cycles will be given to interlacing. Thus there will be 144 color fields, 72 complete color frames, and 24 complete color images per second.

The motor 4, Figs. 1 and 2, which drives the pulley 2 should be split phase or the type motor which runs by induction rather than by the use of brushes, so as to be noiseless. The axles 5, 5′, 6 and 6′, Fig. 2, will move in proper ball bearings for silence of operation. The pulleys will be made of some sturdy light weight material such as a magnesium alloy or even wood or fiber or molded plastic. They must be accurately centered, and the belt must be squared to fit the pulleys perfectly. Spool-like pulleys may be used, with a few inches on each end for traction, to avoid clouding the transparency of the belt area which passes before the tube face.

The diameter of the pulleys will be in proportion to the length of the belt and to the speed of the motor. The desired speed may be obtained by belting the motor to an additional small pulley 2′ attached to the axle 6′ of the pulley 2 as shown in Fig. 2–A. Also the motor will be controlled by a synchronizing pulse such as used with a scanning disk, in order to keep the proper color filters before the tube face at each scanning interval.

Such mechanical and electronic controls and adjustments may be easily accomplished by those skilled in such matters. And such details as size of pulleys, width of filter segments, length of filter segments, speed of motor, speed of pulleys, and timing will vary with the size of the picture tube and the results desired.

It is obvious that the entire unit shown in Fig. 1 may be housed in a cabinet whose sides will serve as a frame in which the axles of the pulleys turn and to which will be attached braces or other means for holding up the motor and holding it in position, etc.

Fig. 4 shows an alternate arrangement of pulleys and belt in order that part of the device including the motor 4 may be disposed above the top of the television cabinet 11, leaving unhampered space for dialing knobs and for speaker opening 13. Two additional pulleys 2′ and 3′ are used in this modification. Otherwise the principles of operation are the same. It should also be pointed out that the belt may move in either direction.

An essential feature of the invention consists of the color belt which is made to pass before the tube face by the means indicated, involving a different principle of operation from color disks or drums—both well-known methods—and constituting a marked improvement over said methods, especially where a large receiving tube is used, for example a tube with an image screen 22″ wide.

For the purpose of three dimensional analyzation of intermittently appearing right and left eye color fields, belts similar to those shown in Figs. 1, 2, 3, and 4 may comprise, in addition to color segments, polarizing segments in rotation, each polarizing segment polarizing light that passes therethrough in a direction at right angles to that of the succeeding polarizing segment. The polarizing filter segments will be arranged on the belt so that two segments having polarizing axes extended in the same direction will be before the tube face at a given moment when two corresponding color or birefringent segments are also before the tube face. Thus the color fields, when presented on the tube face as intermittent right and left eye stereoscopic fields, will not only be given the proper color but will be separated into right and left eye images, all right eye images polarized in one direction and all left eye images polarized at right angles thereto. However in order to accomplish this it will be necessary to increase the number of filter segments of the belt from 6 to 12.

Obviously if desired the color segments of such a belt may be omitted and only the polarizing segments retained for black and white three dimensional separation.

Since a color belt of the nature disclosed in Figs. 1, 2, 3 and 4 cannot be effectively used for the indicated purpose with a receiving tube of the retentive type, other means must be resorted to to overcome the obvious difficulty. The difficulty referred to is the fact that with a retentive type tube, the field blanking time being only a small percentage of the field scanning interval, the wrong color segments would be partially before the tube face at certain times due to the fact that the inside of the belt toward the tube face is moving in one direction while the opposite side is moving in the opposite direction.

This difficulty may be overcome by omitting color segments from the belt and substituting birefringent areas instead. By adding a pair of polarizing filters before the tube face, properly positioned relative to the "birefringent" belt, the outside of the belt will be transparent and colorless to an observer while the birefringent areas passing before tube face on the inside of the belt will provide a color effect which will serve instead of color or colored filters.

Referring to Fig. 5, 7′ indicates a belt of the nature just disclosed. 14 and 14′ are the polarizing sheets or filters which are large enough to cover the face of the receiver tube face. In Figs. 5–A and 5–B the vertical and horizontal lines indicate the direction of the polarizing axes of the two filters. The polarizing axes may be in line with each other or otherwise positioned with similar results provided the optical axes of the birefringent areas of the belt are correspondingly arranged.

Let us assume, however, that the polarizing axes of the two polarizing filters are extended in a direction at right angles to each other and that they are in positions 14 and 14', Fig. 5, as shown, that is, one is between the birefringent belt and the picture tube, and the other positioned between the two sides of the said belt. The polarizing filters and the back side of the belt are preferably placed as near the tube face as possible without touching each other. Although various birefringent materials may be used, let us assume that cellophane of .001'' thickness is to be used. Looking again at Fig. 3, let us keep in mind that birefringent material is to be substituted instead of the color filters shown in this figure. In order to get the desired color effects, different layers or thicknesses of the .001'' cellophane must be used in each belt segment which corresponds to a given color. Instead of the red color filters *e* and *f* there will be substituted three thicknesses or layers of the .001'' cellophane. Instead of the blue color filters *a* and *b* there will be substituted two layers of the cellophane, and instead of the green color filters *c* and *d* there will be substituted four layers of the cellophane. All of the cellophane layers throughout the belt will have their optical axes extended in a single direction, and that direction will be such that when the various filter areas of the belt pass between the polarizing filters the said optical axes will be extended in a direction at an angle of 45° to the polarizing axis of each polarizing filter.

With the cellophane so arranged on the belt, the belt will now operate in a manner similar to that of Figs. 1 and 3, with this exception: Color image dissection now takes place only on the back side of the belt. As each segment passes between the polarizing filters, it will appear red, blue or green to the eye of an observer, thus giving the proper color to the corresponding images appearing on the tube face, while the front side of the belt will appear colorless to the eye of an observer.

Since ordinarily in retentive type picture tubes the scanning of the images takes place from top to bottom, it will be necessary for the belt to move so that the filters move in a downward direction as they pass between the polarizing filters and before the tube face.

The movement of the belt will be so timed as each birefringent section begins to pass in front of the tube face, the image will begin to be scanned and, as the filter segment continues to pass over the image area of the tube face, the scanning beam tends to follow close behind the leading edge of the filter area. Thus, for example, when the filter area which gives a red color to the image corresponding to the red in the scene at the transmitter has completely covered the tube face, that particular image has been completely scanned. Then comes a brief interval called the blanking period, during which the scanned image disappears and the luminance of the tube ceases. It is during this interval that the scanning beam returns to the top of the picture in order to begin the scanning of a new field. Each separate birefringent segment will be long enough to include this blanking interval, that is, a new filter segment will not begin to pass over the tube face until the blanking period of the last scanned image is passed. Thus each filter segment will remain in front of the entire tube face until the scanning beam has returned to the top of the image area.

It is obvious that this birefringent filter belt may be operated before the face of a non-retentive tube in a manner similar to that disclosed above with reference to the device of Figs. 1 and 2.

Also the belt arrangement of Fig. 4 may be applied to the birefringent belt.

If desired, in order to give strength to the birefringent belt, a non-birefringent and non-depolarizing transparent belt of such material as cellulose acetate of from .005'' to .050'' (or more) thick may be used as a base to which the birefringent layers are cemented or otherwise attached. Also the first and second layers of cellophane, since they are continuous, that is, included in each of the birefringent filters, may be in the form of a belt the same size and length as the said base belt.

A modified form of the birefringent belt, and a highly desirable one, is to omit the use of layers of cellophane or birefringent material and use instead a single belt of a plastic such as polyvinyl alcohol which has its filter area surfaces molecularly aligned to the necessary degree of birefringence to produce the desired colors when passed between the two polarizing filters. This will cut down on the number of layers of material and will increase the clarity of the viewed images.

Still another modification of the belt which will eliminate the necessity of so many thicknesses of material is that in which the base belt, instead of being merely a transparent material, is a belt of polarizing material with its polarizing axis running either lengthwise of the belt or horizontally with respect to the length of the belt. Attached to the outer side of the belt will be the birefringent material as described above. The central polarizing filter 14' will also be eliminated, and the remaining one will be crossed with the belt, with respect to polarizing axes. Or if the polarizing belt has an outer surface composed of such a plastic as polyvinyl alcohol, the birefringent areas may be obtained by different degrees of molecular alignment, as disclosed above.

Still another modification of the belt which decreases the amount of attaching or cementing to be done is that in which the first two thicknesses of the cellophane are attached to the polarizer which is next to the tube face on the side of the said filter next to the belt. The remaining birefringent filters or areas will be on the belt.

By choosing a birefringent material of the proper thickness it is possible to obtain the desired variations in color by using only one thickness to a filter area. This of course is desirable, but the birefringent material used must be carefully chosen or specially manufactured to the proper degree of birefringence.

If a polarizing belt is used, such as disclosed above with molecularly oriented areas, it may be found advantageous to let one of the birefringent areas be a part of the stationary filter 14, the other being eliminated as pointed out above, for example the correct degree of birefringence to produce green may exist on the said stationary filter; then there will be no need for birefringence in the corresponding green area on the belt—birefringent molecular orientation will of course exist in the red and blue areas on the belt. This will permit more light to be transmitted in the green area which tends more to darken the image than blue or red.

The color areas or birefringent areas need not be any particular shape as long as they serve properly their purpose of covering the image screen at the proper time; however for convenience they are preferably square or rectangular.

All of the combinations and variations suggested or disclosed above, and others not mentioned, are possible and fall within the scope of the invention.

Since color filters, birefringent filters and polarizing material tend to darken the brightness of the scanned image on the tube face, it may be necessary in certain cases to make certain adjustments in the electronic controls of the receiver in order to step up the brightness of the image. Ordinarily if this were done, flicker would be expected in the white or bright areas of a color picture. But when polaroid is used, the white areas will be sufficiently darkened that image brightness may be stepped up considerably without producing flicker.

A further modification of the belt of Figs. 1, 2 and 3 is shown in Fig. 6. The belt will have 9 or 12 color segments. Where the belt is to operate outside of the conventional television cabinet in the capacity of a converter, 12 segments will probably be necessary. The color segments will be in the same order of color sequence as that in the belt of Fig. 3. However there is a variation of the manner of operation of the belt.

As shown in Fig. 7, only one side of the belt 7'' passes before the tube face at a given moment, whereas in the operation disclosed relative to Fig. 1 both sides of the belt pass before the tube face simultaneously. As shown in Fig. 7, the belt passes entirely around the television cabinet in this converter application. The belt, utilizing four pulleys 2, 2', 3 and 3', a motor 4, with smaller pulleys 29 and 30 and belts 31 and 32 (see Fig. 7) passes over, under, and up or down the front side and up or down the back of the set. Of course the belt may be shortened and incorporated within the cabinet, but this would probably present great difficulties in a conversion arrangement and would probably only proove practical in new sets. Fig. 7 shows the indented frame 15 before the face of a television tube in a conventional set, and 16 is a larger indented frame corresponding to frame 15 in order to permit wider viewing angle.

It is obvious that, by adding extra pulleys, the belt may be made to pass close to the tube face, thus eliminating the necessity for the wide frame 16. Such a frame may then be of nearly equal size with that of frame 15.

Fig. 8 shows the manner in which the belt is to pass before the image over and under the television set.

The action of the movement of Figs. 6, 7, and 8 is essentially the same as that of Figs. 1, 2 and 3. Variation in the timing will be necessary, and especially with respect to whether or not a retentive or non-retentive tube is used. The retentive type tube is preferable, however.

A further obvious form of the belt of Figs. 6, 7, and 8 is one in which birefringent segments take the place of the color segments in a manner similar to that disclosed in the above description relative to Fig. 5. The polarizing means here, as there, may be either a pair of stationary polarizing filters, 14 and 14' such as shown in Figs. 5-A and 5-B through which the birefringent belt passes, or may be incorporated into the belt itself as a double layer of polarizing areas, one said layer superimposed on each side of each birefringent segment. Or, as disclosed above, the belt itself may be made of a polarizing material or contain polarizing surfaces with the birefringent segments disposed between the said surfaces.

The principal advantage of the type belt shown in Figs. 6, 7 and 8 is that such a belt and its operation is desirably adaptable to certain three dimensional color television applications. The utility of such a belt will only be realized, however, in sets using large faced picture tubes or in conversion units for large faced tubes. This is because color disks are quite satisfactory when used with tubes with screens measuring not more than 12½'' wide.

In my copending patent application "Stereoscopic Television" (Serial No. 173,039, filed March 26, 1951) there is disclosed a reciprocating polarizing filter for obtaining three dimensional views of a three dimensional television image appearing on the face of a tube in cross polarized light. Where a color disk is used, such a reciprocating filter will be unnecessary since polarizing analyzers may be incorporated within a filter disk having either six or 12 color segments which will properly dissect the three dimensional color image according to certain previously disclosed methods. However, since as pointed out above such color disks are not feasible for larger image screens, the color belt of Fig. 6 may be used advantageously for dissecting color images, but a polarizing analyzer will be needed in order to obtain a three dimensional view of three dimensional color images. Thus a reciprocating polarizing filter may be used for this purpose. However such a reciprocating filter requires extra driving power and mechanism.

Fig. 9 indicates a color belt comprising, in addition to color, or birefringent filters, polarizing filters in the filter areas indicated by the arrows 17—28. The polarizing axes of alternating filters will be at right angles to each other or in substantial contrast to each other with respect to their directions of polarization as indicated by the alternating directions of the arrows 17—28.

With such a belt in operation before a picture tube, as indicated in Figs. 7 and 8, if every other scanned image field is a right eye stereoscopic field and every other field is a left eye stereoscopic field, then with the filter areas of the belt passing before the image in proper synchronism with the transmission of said images, not only will proper color dissection take place but also proper three dimensional analyzation.

For example: if 144 color fields are being transmitted per second, 72 of these will be right eye image fields and 72 left eye image fields. Each color segment taking position before the tube face in order to give the proper color to a particular scanned field will also, due to the polarizing filter combined therewith, make that field visible to the proper eye of an observer and will be immediately followed by the next filter segment with its polarizing filter which will make this succeeding field visible to the other eye. Thus the sequence will continue until 72 right eye color fields and 72 left eye color fields have been properly presented to the eyes of an observer.

The belt of Fig. 9 may comprise a base of cellulose acetate with color filters and polarizing filters attached or cemented thereto. Polaroid, a suitable polarizing material for the polarizing filters can be made very thin and yet function properly as the required filters. Thinness of the polarizing filters would make them more easily attached to the belt.

There are various ways in which such a belt may be made; however the preferred form would be a belt of some such material as colored polyvinyl alcohol. The coloring would of course vary from color area to color area. One surface of the belt will be a polarizing surface, preferably of one piece with the belt. The integral feature may be obtained by molecularly orienting each filter area in the desired polarizing direction, then staining said surface with a dichroic stain.

Obviously if desired the color segments or birefringent segments may be omitted and only the polarizing segments retained for black and white three dimensional analyzation.

Various modifications relative to the material used, and the design and shape of the filters-size-timing, etc. are applicable to this type belt as indicated for the belt of Figs. 1, 2 and 3. And all such variations and modifications fall within the scope of the invention.

For example it is quite obvious that modifications may be introduced in which any of the above described belts or their variations are made to move in a horizontal direction before the tube face. Such a modification may be especially advantageous in applying the belts indicated in Figs. 6, 7, 8 and 9, either as conversion units or in new sets. Thus instead of the belt passing over and under the set, it would pass around the set on all sides.

Obviously in such modifications there will be certain obvious positional changes made relative to stationary polarizing filters, etc.

Also such belts as disclosed in the various figures of the drawings and defined in the above specifications may obviously be used at the transmitter as well as the receiver.

Also filter segments of different colors or of different birefringent characteristics for producing different colors from those disclosed and suggested above, namely red, blue and green—may be used without departing from the scope of the invention.

I claim:

1. The combination of a picture tube of a television receiving set presenting a series of image fields in light and shadow on the face of said tube, the sum of the said image fields comprising a complete image of a transmitted scene, and a flat, broad, endless belt made of a thin transparent material comprising filter segments of retardation material in rotation, each filter segment having light transmission characteristics designed to transmit light from a corresponding image field and to give a particular characteristic to the said transmitted light which appears upon the tube face, means for moving the said belt before the face of the said picture tube in linear directions only and in synchronism with the appearance of the said image fields so that the proper filter area is before its proper image field at a given proper moment, and polarizing filter material in register with the said filter segments and the face of the picture tube during said appearance of the image fields.

2. The combination of a picture tube of a television receiving set presenting a series of image fields in light and shadow on the face of the said tube, the sum of the said image fields comprising a complete image of a transmitted scene, and a flat, broad, endless belt made of a thin transparent material comprising birefringent filter segments in rotation and consisting of material transparent and colorless as viewed by transmitted, unpolarized light and a light polarizing means in cooperative relation to the said birefringent filter segments, each said filter segment possessing a different degree of birefringence to that of the succeeding filter segment of the said belt and having light transmission characteristics designed to (in cooperation with the said light polarizing means) transmit light from a corresponding image field which appears upon the tube face and to give to said light a particular color, and means for moving the said belt before the face of the said picture tube in linear directions only and in synchronism with the appearance of the said image fields so that the proper filter area is before its proper image field at a given proper moment.

3. The combination of a picture tube of a television receiving set presenting a series of image fields in light and shadow on the face of the said tube, the sum of the said image fields comprising a complete image of a transmitted scene, and a flat, broad, endless belt made of a thin transparent material comprising polarizing filter segments in rotation, each said polarizing filter segment having an area commensurate with that of the image fields and polarizing light passing therethrough in one direction, said direction being in substantial contrast to the polarizing direction of the succeeding filter segment of the said belt and having light polarizing characteristics designed to polarize the light from a corresponding image field which appears upon the said tube face in a predetermined direction, and means for moving the said belt before the face of the said picture tube in linear directions only and in synchronism with the appearance of the said image fields so that the proper filter area is before its proper image field at a given proper moment.

4. The combination of a picture tube of a television receiving set presenting a series of image fields in light and shadow on the face of the said tube and a flat, broad, endless (or continuous) belt made of a thin transparent material comprising color filter segments in rotation, and polarizing filter segments in rotation, the said polarizing filter segments being in superimposed relation to the said color filter segments respectively, each said color filter segment possessing light transmission characteristics designed to transmit light from a corresponding image field which appears upon the said tube face and to give a particular color to said light, and each said polarizing filter segment polarizing light passing therethrough in one direction, said direction being in substantial contrast to the polarizing direction of the succeeding filter segment of the said belt, the light polarizing characteristics of each said filter segment being designed to polarize the light from a corresponding image field which appears upon the said tube face in a predetermined direction, the said polarizing filter segments and color filter segments being in cooperative relation with each other respectively, for the purpose of presenting a full color three dimensional view to the eye of an observer, and means for moving the said belt in a closed path with portions of the belt traveling in opposite directions and both said portions passing before the face of the picture tube in linear directions only and presenting to an observer a direct view of the said image through both said oppositely travelling portions of the belt simultaneously, the travel of the said portions of the belt before the face of the tube being in synchronism with the appearance of the said image fields so that the proper composite filter area is before its proper image field at a given proper moment.

5. The combination of a picture tube of a television receiving set presenting a series of image fields in light and shadow on the face of the said tube, the sum of the said image fields comprising a complete image of a transmitted scene, and a flat, broad, endless belt made of a thin transparent material comprising birefringent filter segments in rotation and polarizing filter segments in rotation, the said polarizing filter segments being in superimposed relation to the said birefringent filter segments respectively, each said birefringent filter segment possessing light transmission characteristics designed to (in cooperation with the said polarizing filter segments) transmit light from a corresponding image field which appears upon the said tube face and to give a particular color to said light, and each said polarizing filter segment polarizing light passing therethrough in one direction, said direction being in substantial contrast to the polarizing direction of the succeeding filter segment of the said belt, the light polarizing characteristics of each said filter segment being designed to polarize the light from a corresponding image field which appears upon the said tube face in a predetermined direction and the said polarizing filter segments and birefringent filter segments being in cooperative relation with each other for the purpose of presenting a full color three dimensional view to the eye of an observer, and means for moving the said belt in a closed path with portions of the belt traveling in opposite directions and both said portions passing before the face of the picture tube in linear directions only and presenting to an observer a direct view of the said image through both said oppositely traveling portions of the belt simultaneously, the travel of the said portions of the belt before the face of the tube being in synchronism with the appearance of the said image fields so that the proper composite filter area is before its proper image field at a given proper moment.

6. The combination of a picture tube of a television receiving set presenting a series of image fields in light and shadow on the face of the said tube and a flat, broad, endless belt made of a thin transparent material comprising colored filter segments in rotation and each having an area commensurate with that of the image fields, each said filter segment having light transmission characteristics designed to transmit light from a corresponding image field which appears upon the said tube face and to give a particular color to said light, and means for moving the said belt in a closed path with portions of the belt spaced apart and traveling in opposite directions and both said portions passing before the face of the said picture tube and in linear directions only and so timed that two of the said filter segments of a given color area before the tube face and in superimposed relation with each other at a given moment and directly in the path of radiation transmitted from the image field to the view point of an observer, the entire space between said superimposed filter segments at said given moment being occupied by a medium transparent to said radiation and thereby permitting free and unobstructed transmission of the radiation through both said superimposed filter segments to the view point of the observer, said movement being in synchronism with the appearance of the said image fields so that the proper filter areas are before their proper image fields respectively at a given proper moment to the end of presenting to the view of an observer a television image in full color.

7. The combination of a picture tube of a television receiving set presenting a series of image fields in light and shadow on the face of the said tube and a flat, broad, endless belt made of a thin transparent material comprising filter segments of retardation material in rotation, polarizing filter material positioned to register with the filter segments when the latter are in register with the image fields, each said filter segment having light transmission characteristics designed to transmit light from a corresponding image field which appears upon the said tube face and to give a particular color to said light, and means for moving the belt in a closed path surrounding the picture tube and with the belt traveling in front of the face of the said picture tube in a single linear direction only and in synchronism with the appearance of the said image fields so that the proper filter area is before its proper image field at a given proper moment.

8. The combination of a picture tube of a television receiving set presenting a series of image fields in light and shadow on the face of the said tube, the sum of the said image fields comprising a complete image of a transmitted scene and a flat, broad, endless belt made of a thin transparent material comprising birefringent filter segments in rotation and consisting of material transparent and colorless as viewed by transmitted, unpolarized light, and a plurality of polarizing filters positioned before the tube face, each said filter segment possessing a different degree of birefringence to that of the succeeding filter segment of the said belt and having light transmission characteristics designed to (in cooperation with the said plurality of polarizing filters) transmit light from a corresponding image field which appears upon the tube face and to give to said light a particular color, and means for moving the said belt in a closed path with portions of the belt traveling in opposite directions and both said portions passing before the face of the said picture tube in linear directions only and presenting to an observer a direct view of the said image through both said oppositely traveling portions of the belt simultaneously, the said travel of the belt portions before the face of the tube being in synchronism with the appearance of the said image fields so that the proper filter area is before its proper image field at a given proper moment.

9. The combination of a picture tube of a television receiving set presenting a series of image fields in light and shadow upon the face of the said tube, the sum of the said image fields comprising a complete image of a transmitted scene and a flat, broad, endless belt made of a thin transparent material comprising birefringent filter segments in rotation and consisting of material transparent and colorless as viewed by transmitted, unpolarized light, each said filter segment possessing a different degree of birefringence to that of the succeeding filter segment of the said belt and having light transmission characteristics designed to transmit light from a corresponding image field which appears upon the tube face and to (in cooperation with the polarizing areas later mentioned) give to said light a particular color, the said belt also comprising polarizing areas which are superimposed upon the said birefringent filter segments, the said polarizing areas having a polarizing axis extended in a single direction throughout said belt, and a stationary polarizing filter positioned next to the said tube face, the said birefringent filter segments when in active position before the tube face being between the said stationary polarizing filter and a corresponding polarizing area of the said belt, and means for moving the said belt before the face of the said picture tube in linear directions only and in synchronism with the appearance of the said image fields so that the proper filter area is before its proper image field at a given proper moment.

10. The combination of a picture tube of a television receiving set presenting a series of image fields in light and shadow upon the face of the said tube, the sum of the said image fields comprising a complete image of a transmitted scene and a flat, broad, endless belt made of a thin transparent material comprising birefringent filter segments in rotation and consisting of material transparent and colorless as viewed by transmitted, unpolarized light, each said filter segment possessing a different degree of birefringence to that of the succeeding filter segment of the said belt and having light transmission characteristics designed to transmit light from a corresponding image field which appears upon the tube face and to (in cooperation with the polarizing areas later mentioned) give to said light a particular color, the said belt also comprising a plural polarizing means in cooperative relation with said birefringent filter segments, the said filter segments when in active position before the tube face being between the two aspects of the said plural polarizing means, and means for moving the belt in a closed path surrounding the picture tube and with the belt traveling in front of the said tube face in a single linear direction only, and in synchronism with the appearance of the said image fields so that the proper filter area is before its proper image field at a given proper moment.

11. The combination of a picture tube of a television receiving set presenting a series of image fields in light and shadow on the face of the said tube, the sum of the said image fields comprising a complete image of a transmitted scene, and a flat, broad, endless belt made of a thin transparent material comprising polarizing filter segments in rotation, each said polarizing filter segment polarizing light passing therethrough in one direction, said direction being at right angles to the polarizing direction of the succeeding filter segment of the said belt and having light polarizing characteristics designed to polarize the light from a corresponding image field which appears upon the said tube face in a predetermined direction, and means for moving the said belt in a closed path with portions of the belt traveling in opposite directions and both said portions passing before the face of the said picture tube in linear directions only and so timed that two of the said filter segments having like polarizing axes are before the tube face and in superimposed relation with each other at a given moment and in the path of radiation transmitted in a straight line from the face of the picture tube to and through the superimposed filter segments, said movement being in synchronism with the appearance of the said image fields so that the proper filter areas are before their proper image fields at a given proper moment to present to the view of an observer a right eye stereoscopic view polarized in one direction, and a left eye stereoscopic view polarized at right angles thereto.

12. The combination of a picture tube of a television receiving set presenting a series of image fields in light and shadow on the face of the said tube, the sum of the said image fields comprising a complete image of a transmitted scene, and a flat, broad, endless belt made of a thin transparent material comprising polarizing filter segments in rotation, each said polarizing filter segment having an area commensurate with that of the image fields and polarizing light passing therethrough in one direction, said direction being at right angles to the polarizing direction of the succeeding filter segment of the said belt and having light polarizing characteristics designed to polarize the light from a corresponding image field which appears upon the said tube face in a predetermined direction, and means for moving the said belt in a closed path surrounding the picture tube and with the belt traveling before the face of the said picture tube in a single linear direction only and in synchronism with the appearance of the said image fields so that the proper filter area is before its proper image field at a given proper moment.

13. The combination of a picture tube of a television receiving set presenting a series of image fields in light and shadow on the face of the said tube and a flat, broad, endless (or continuous) belt made of a thin transparent material comprising color filter segments in rotation, and polarizing filter segments in rotation, the said polarizing filter segments being in superimposed relation to the said color filter segments respectively, each said color filter segment possessing light transmission characteristics designed to transmit light from a corresponding image field which appears upon the said tube face and to give a particular color to said light, and each said polarizing filter segment polarizing light passing therethrough in one direction, said direction being at right angles to the polarizing direction of the succeeding filter segment of the said belt, the light polarizing characteristics designed to polarize the light from a corresponding image field which appears upon the said tube face in a predetermined direction, and means for moving the said belt in a closed path with portions of the belt traveling in opposite directions and both said portions passing before the face of the said picture tube in linear directions only and so timed that two of the said filter segments having like polarizing axes and like color filter segments are before the said tube face and in superimposed relation with each other at a given moment and in the path of radiation transmitted in a straight line from the face of the picture tube to and through the superimposed filter segments, said movement being in synchronism with the appearance of the said image fields so that the proper composite filter areas are before their proper image fields at a given proper moment, presenting to the eye of an observer a full color right eye stereoscopic view polarized in one direction and a full color left eye stereoscopic view polarized at right angles thereto.

14. The combination of a picture tube of a television receiving set presenting a series of image fields in light and shadow on the face of the said tube and a flat, broad, endless (or continuous) belt made of a thin transparent material comprising color filter segments in rotation, and polarizing filter segments in rotation, each of said segments having an area commensurate with that of the image fields, the said polarizing filter segments being in superimposed relation to the said color filter segments respectively, each said color filter segment possessing light transmission characteristics designed to transmit light from a corresponding image field which appears upon the said tube face and to give a particular color to said light, and each said polarizing filter segment polarizing light passing therethrough in one direction, said direction being in substantial contrast to the polarizing direction of the succeeding filter segment of the said belt, the light polarizing characteristics of each said filter segment being designed to polarize the light from a corresponding image field which appears upon the said tube face in a predetermined direction, the said polarizing filter segments and color filter segments being in cooperative relation with each other respectively, for the purpose of presenting a full color three dimensional view to the eye of an observer, and means for moving the said belt in a closed path surrounding the picture tube and with the belt traveling before the face of the said picture tube in a single linear direction only and in synchronism with the appearance of the said image fields so that the proper composite filter area is before its proper image field at a given proper moment.

15. The combination of a picture tube of a television receiving set presenting a series of image fields in light and shadow on the face of the said tube and a flat, broad, continuous belt made of a thin transparent material comprising birefringent filter segments in rotation and polarizing filter segments in rotation, the said polarizing filter segments being in superposed relation to the said birefringent filter segments respectively, each said birefringent filter segment possessing a different degree of birefringence to that of the succeeding filter segment of the said belt, the said degree of birefringence ranging from an appreciable amount of birefringence to zero birefringence and the said birefringent filter segments having light transmission characteristics designed to transmit light from a corresponding image field which appears upon the said tube face and to (in cooperation with certain of said polarizing filter segments) give to said light a particular color, and each said polarizing filter segment polarizing light passing therethrough in one direction, said direction being in substantial contrast to the polarizing direction of the succeeding filter segment of the said belt, the light polarizing characteristics of each said filter segment being designed to polarize the light from a corresponding image field which appears upon the said tube face in a predetermined direction and the said birefringent filter segments and polarizing filter segments being in cooperative relation with each other respectively for the purpose of presenting a full color three dimentional view to the eye of an observer, and means for moving the said belt in a closed path with portions of the belt traveling in opposite directions and both said portions passing before the face of the said picture tube in linear directions only and so timed that two of the said filter segments having polarizing axes which are extended in the same direction are before the tube face and in superimposed relation with each other at a given moment, said movement being in synchronism with the appearance of the said image fields so that the proper composite filter areas are before their proper image fields at a given proper moment and present to the view of an observer a full color right eye stereoscopic view polarized in one direction and a full color left eye stereoscopic view polarized at right angles thereto.

16. The combination of a picture tube of a television receiving set presenting a series of image fields in light and shadow on the face of the said tube and a flat, broad, continuous belt made of a thin transparent material comprising birefringent filter segments in rotation and polarizing filter segments in rotation, the said polarizing filter segments being in superposed relation to the said birefringent filter segments respectively, each said birefringent filter segment possessing a different degree of birefringence to that of the succeeding filter segment of the said belt, the said degree of birefringence ranging from an appreciable amount of birefringence to zero birefringence and the said birefringent filter segments having light transmission characteristics designed to transmit light from a corresponding image field which appears upon the said tube face and to (in cooperation with certain of the said polarizing filter segments) give to said light a particular color, and each said polarizing filter segment polarizing light passing therethrough in one direction, said direction being in substantial contrast to the polarizing direction of the succeeding filter segment of the said belt, the light polarizing characteristics of each said filter segment being designed to polarize the light from a corresponding image field which appears upon the said tube face in a predetermined direction and the said birefringent filter segments and polarizing filter segments being in cooperative relation with each other respectively for the purpose of presenting a full color three dimensional view to the eye of an observer, and means for moving the said belt in a closed path surrounding the picture tube and with the belt traveling before the face of the said picture tube in a single linear direction only, said movement being in synchronism with the appearance of the said image fields so that a proper composite filter area is before its proper image field at a given proper moment, thereby presenting to the view of an observer a full color right eye stereoscopic view polarized in one direction and a full color left eye stereoscopic view polarized at right angles thereto.

References Cited in the file of this patent

UNITED STATES PATENTS

| Number | Name | Date |
|---|---|---|
| 2,259,884 | Goldsmith | Oct. 21, 1941 |
| 2,264,748 | Flechsig | Dec. 2, 1941 |
| 2,339,256 | Dencaster | Jan. 18, 1944 |
| 2,452,293 | De Forest | Oct. 26, 1948 |
| 2,508,920 | Kell | May 23, 1950 |
| 2,514,043 | Engstrom | July 4, 1950 |